United States Patent
Dover

[11] Patent Number: 6,129,361
[45] Date of Patent: Oct. 10, 2000

[54] FLUID CONDUIT SEAL

[75] Inventor: Harry Dover, Dearborn, Mich.

[73] Assignee: Ford Global Technologies, Inc., Dearborn, Mich.

[21] Appl. No.: 09/110,284

[22] Filed: Jul. 6, 1998

[51] Int. Cl.⁷ ....................................... F16D 25/11
[52] U.S. Cl. .................. 277/602; 277/608; 277/630; 192/87.13
[58] Field of Search ...................... 277/602, 608, 277/630, 637, 644, 911, 618, 624; 192/85 CA, 87.13

[56] References Cited

U.S. PATENT DOCUMENTS

| | | | |
|---|---|---|---|
| 4,684,004 | 8/1987 | Stark | 192/87.13 |
| 5,054,743 | 10/1991 | Norkey et al. | 251/149.6 |
| 5,163,722 | 11/1992 | Worden | 285/375 |
| 5,222,631 | 6/1993 | Hood | 222/131 |
| 5,419,013 | 5/1995 | Hsiao | 16/319 |
| 5,848,780 | 12/1998 | Miller et al. | 251/129.21 |
| 5,960,841 | 10/1999 | Green | 141/383 |
| 5,993,412 | 11/1999 | Deily | 604/68 |

*Primary Examiner*—Anthony Knight
*Assistant Examiner*—Mark Williams
*Attorney, Agent, or Firm*—Frank G. McKenzie

[57] ABSTRACT

A conduit seal is provided for sealing a passageway in an automotive transmission. The transmission has an oil passageway and a member covering the passageway. The passageway is in fluid communication with a clutch. A bore communicates oil from the passageway to a passageway provided in the clutch. An annular seal is sealingly engaged with the bore of the case and the clutch to provide a fluid conduit therebetween. A compliant member is provided between the annular seal and the cover member to axially urge the seal into sealing engagement with the outer surface of the clutch.

14 Claims, 2 Drawing Sheets

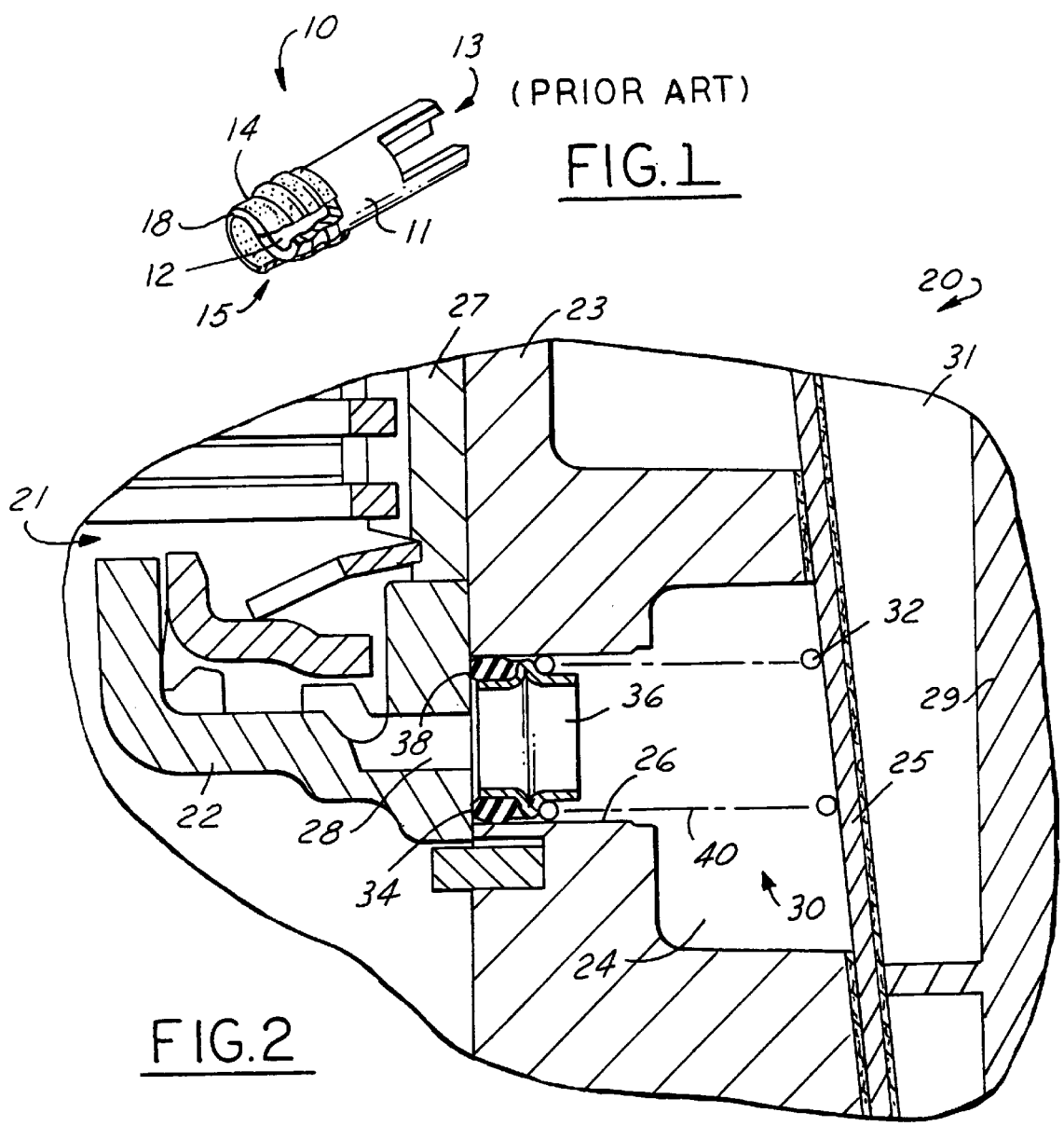
FIG. 1 (PRIOR ART)
FIG. 2
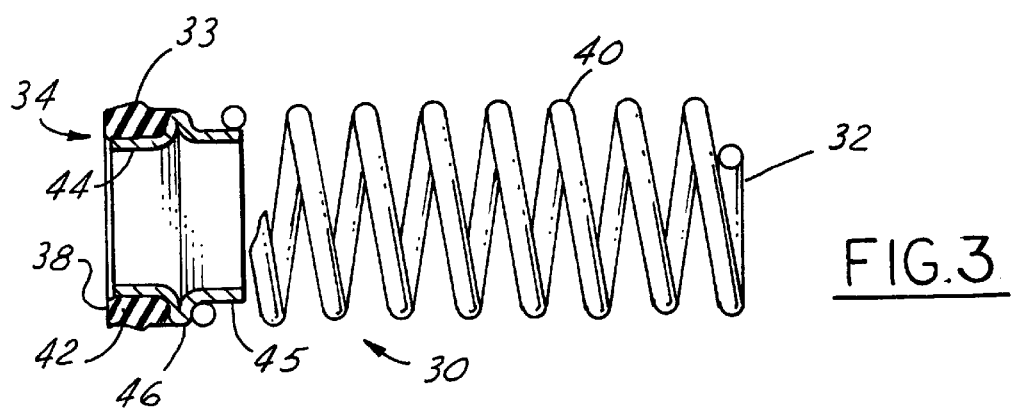
FIG. 3

FLUID CONDUIT SEAL

BACKGROUND OF THE INVENTION

1. Field of the Invention

The present invention relates to a fluid conduit which includes a seal which has a bore sealing element and a face sealing element, and, more particularly, such a seal for use in an automotive transmission oil supply.

2. Description of Related Art

In an automatic transmission, pressurized fluid is supplied to various clutches and brakes to effect a shift to a desired transmission gear ratio. The pressurized fluid is routed from a valve through a manifold and various passageways to a particular clutch being applied. One such clutch comprises a clutch cylinder having an internal spline driveably engaged with a plurality of clutch plates. The clutch plates are interlaced with a plurality of clutch plates which are engaged to a hub through a splined engagement.

The oil passageway for such a clutch includes a radially directed bore through the wall of the transmission case in registration with a corresponding passageway in the clutch cylinder.

As illustrated in Prior Art FIG. 1, a tube 10 is provided to be inserted in the bore of a transmission case to provide a fluid passageway through the transmission case to the passage in the cylinder. Such a tube 10 includes a face seal 18 at an end 15 thereof to communicate fluid therethrough to the cylinder, while attempting to not lose fluid to the environment around the cylinder. The tube 10 comprises a hollow rigid substrate 11 with a slotted end 13 to provide an oil passageway.

The prior art tube 11 thus includes a lip seal 18 provided at an end 15 in abutment with the outer surface of the cylinder around the periphery of the passageway provided in the cylinder. The lip seal 18 also includes a circumferential rib 16 on the outer surface thereof which engages the bore in the transmission case to prevent fluid from escaping around the seal 18 from within the bore. The opposite end 13 of the rigid tube bears against a rigid transmission member such as a manifold or cover plate.

In a prior art transmission using such a seal, the lip seal 18 had to be of an axial length to accommodate any manufacturing and assembly tolerances in the tube, seal, transmission case, clutch cylinder, manifold, and any other related member within the transmission assembly. Thus, for example, if the outside diameter of the clutch cylinder varied, the lip seal must accommodate the associated radial variation. Likewise, any tolerance in the transmission case relative to the manifold would also be taken up by the length of the lip seal. Because of these tolerances, the lip seal has a length which exceeds that which would be desirable. This excessive length may cause a blowout or extrusion of the seal when the pressure of the fluid exerts a force on the seal which exceeds the rigidity of the seal. And if the seal were too short, fluid would leak. Further, such a long lip may be damaged during installation, because the bore in the case may have a sharp corner due to the manufacture thereof. In any such situation, the result is clutch slippage due to inadequate pressure because of fluid loss.

It would therefore be desirable to provide a seal which provides a fluid conduit and accommodates variation in the transmission assembly without comprising the integrity of the seal.

SUMMARY OF THE INVENTION

It is thus an object of the present invention to provide a seal which provides a fluid conduit and accommodates variation in a transmission assembly.

Accordingly, a conduit seal is provided for sealing a passageway in an automotive transmission. The transmission has a case with an oil passageway and a cover covering the passageway. The passageway is in fluid communication with a clutch cylinder. A bore through the case communicates oil from the passageway to a passageway provided in the clutch cylinder. An annular seal is sealingly engaged with the bore of the case and the cylindrical member to provide a fluid conduit therebetween. A compliant member is provided between the annular seal and the plate to axially urge the seal into sealing engagement with the outer surface of the clutch cylinder.

BRIEF DESCRIPTION OF THE DRAWINGS

FIG. 1 is a partial sectional side view of a Prior Art fluid conduit seal assembly.

FIG. 2 is a partial sectional side view of a transmission illustrating a fluid conduit seal according to the present invention.

FIG. 3 is a sectional side view of a preferred fluid conduit seal according to the present invention.

BRIEF DESCRIPTION OF PREFERRED EMBODIMENTS

Figure 4:
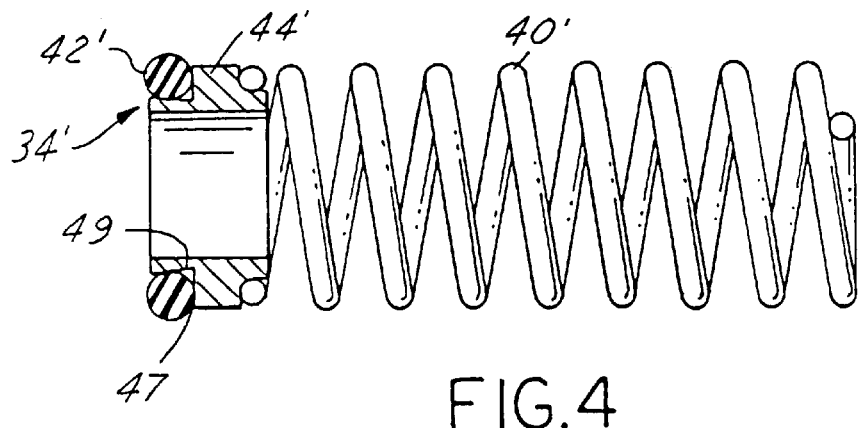
FIG. 4 is a sectional side view of an alternative conduit seal according to the present invention.

FIG. 1 illustrates a Prior Art conduit seal 10. This conduit seal 10 includes a bore 12 to transport fluid from a first end 13 to a second end 15 thereof. At the first end 13, a pair of radial slots 17 are provided to allow fluid to flow therethrough into the bore 12. The second end 15 mates with an annular clutch member, as will be described below with reference to FIG. 2. Conduit seal 10 includes a lip seal 14 having a pair of annular projections 16 to seal a bore within a transmission case, as will be described in further detail below.

The lip seal 14 extends axially, in the form of a lip 18 to engage an annular clutch member, as described below. The lip 18 extends for a distance beyond the end of a plastic substrate 11 which supports the lip seal 14. The lip 18 must be long enough to accommodate any axial variation in the transmission assembly, so the first end 13 abuts with a solid portion of the transmission assembly, such as a manifold, and the lip 18 engages a clutch cylinder of the transmission. The lip 18 is compressed or permitted to extend axially depending on how close the clutch cylinder is with respect to the solid surface against which the first end 13 abuts.

As illustrated in FIG. 2, a transmission assembly 20 is provided. The transmission 20 includes a clutch 21 having a piston housing 22 adjacent a clutch cylinder 27. The transmission further includes a case 23 having an oil passage 24 provided therein. The oil passage 24 includes a bore 26 through the case 23 which is aligned with a passageway 28 in the piston housing 22. The passageway 28 and bore 26 provide a path for the pressurized fluid to travel and thereby apply the clutch 21.

A conduit 30 is provided within the bore 26 and is in communication with the passageway 28 to communicate fluid therethrough. The conduit 30 acts as a seal between the bore 26 and the piston housing 22, and thus provides a passageway for the fluid to communicate therebetween. The conduit 30 includes a fluid passageway 36. The conduit 30 abuts a rigid member, illustrated in FIG. 2 as a cover 25, of the transmission at a first end thereof 32. FIG. 2, the cover 25 acts as a separating plate, sealingly covering open passages 31 in the manifold 29 (or valve body) and case 23. At the second end 34 of the conduit 30, a lip seal 38 is provided. The lip seal 38 is sealingly engaged with the outer periphery of the piston housing 22, while an annular rib 33, as illustrated in FIG. 3, is sealingly engaged with the bore 26 of the case 23. As illustrated in FIG. 2, the rigid member, or cover 25, may not be parallel to the outside of the piston housing 22. Thus, preferably, the conduit 30 can accommodate the nonparallel condition, which was not possible with the prior art design shown in FIG. 1, because the end 13 of the Prior Art conduit 10 would not consistently engage the plate, thereby requiring a much longer lip 18. In the preferred embodiment the helical spring 40 accomplishes the task of accommodating the nonparallel condition. One skilled in the art recognizes the cover 25 could alternatively comprise the valve body, a manifold, or any other member so positioned.

As illustrated in FIG. 3, a preferred seal 38 includes a first end 34. Preferably, the lip seal 38 is assembled to a helical spring 40 at this first end 34, as illustrated in FIG. 3. The lip seal 38 includes an annular rubber portion 42 molded onto a substrate 44. The rubber portion 42 sealingly engages the bore 26 at 33. The substrate 44 includes a cylindrical portion 45 which is inserted within the end 34 of the spring 40. The substrate 44 preferably includes an annular flange 46 to act as a stop to axially locate the lip seal 38 to the spring 40. In a preferred embodiment, the substrate 44 comprises a steel cylindrical member having a stop formed therein to engage the end of the spring 40. Alternatively, the substrate 44 could be made from plastic or any other suitable member. The spring 40 is compressible so that any tolerance or thermal expansion within the transmission assembly is accommodated by the conduit 30 without having to provide an excessively long lip seal 38, yet adequately forcing the lip seal 38 against the piston housing 22 to properly seal therebetween. Inadequate pressure could result in a poor shift (i.e., clutch slippage). Furthermore, the helical spring 40 is designed so that any nonparallelism between a plane represented by the seal to the outer surface of the piston housing 22 and the cover 25 is accommodated without radially collapsing the spring 40. The spring 32 is sized to ensure adequate sealing force of the seal 38 to the housing 22. The seal 38 is designed to deform to the outer contour of the housing 22 and properly seal thereto.

One skilled in the art recognizes that the seal assembly conduit 30 could comprise simply a spring, as illustrated in FIG. 3 at 40, with an annular rubber seal 38 molded directly (not shown) onto the end 34 of the helical spring 40 without using a substrate 44 in an alternative embodiment, not illustrated in FIG. 3.

In a further alternative embodiment, illustrated in FIG. 4, the spring 40' has attached at an end thereof 34' a substrate 44', preferably machined from aluminum, having an O-ring 42' to act as the lip seal described above. In this embodiment, the substrate 44' has a groove or chamfer 47 machined therein to accept the O-ring seal 42', preferably having a back angle 49 to ensure the O-ring 42' remains in place during assembly of the conduit within the transmission case 23. Alternatively, in place of the o-ring seal 42', one skilled in the art recognizes an equivalent seal could be molded upon the substrate 44'.

Figure 5:
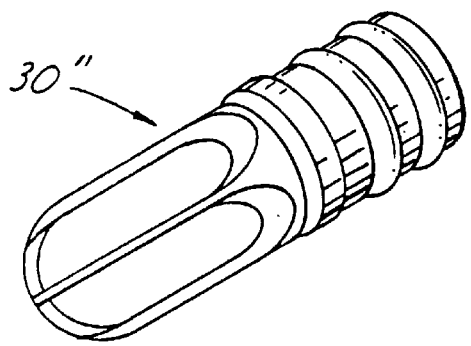
FIG. 5 is a perspective side view of a further alternative embodiment of a conduit seal according to the present invention.
Figure 6:
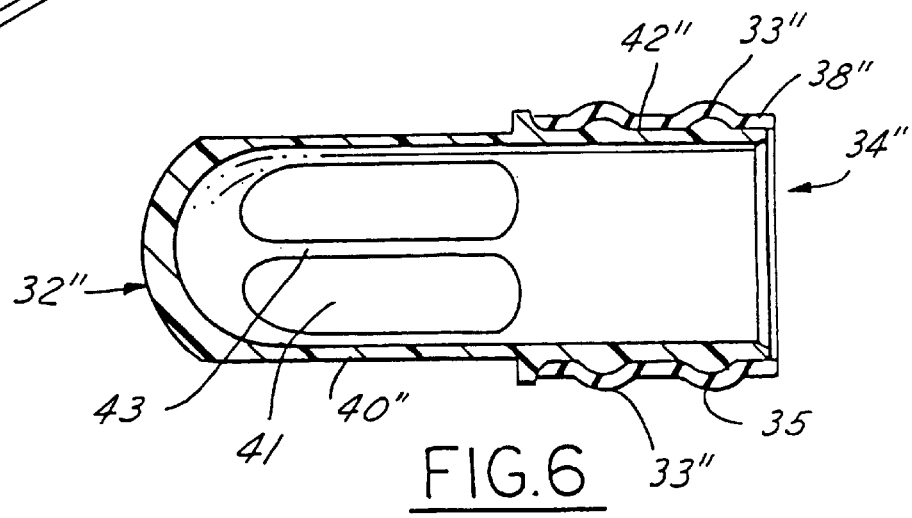
FIG. 6 is a sectional side view of the conduit seal of FIG. 5.

In yet another alternative embodiment illustrated in FIGS. 5 and 6, the spring is replaced by a plastic molded member 40" which is axially resilient. In FIGS. 5 and 6, those elements which are similar in function to those described with reference to FIGS. 2–4 are indicated with a double prime. The member 40" includes a plurality of oil passages, or slots 41, provided about the circumference of a first end 32" of the conduit 30", illustrated as four axially elongate slots 41. The opposite end 32" of the member 40" abuts the cover 25 of the transmission, as described above. The slots 41 weaken the walls of the member 40" by leaving a plurality of webs 43 which are axially compressible when the seal installed in the transmission 20. Although FIGS. 5 and 6 illustrate a closed end 32", one skilled in the art could provide such a seal having an open end, and the webs 43 extending axially to engage the cover 25. A lip seal 38" is provided at the opposite end 34" of the conduit 30", similar to that described above. The lip seal 38" comprises a cylindrical rubber sleeve 42" assembled to the conduit 30". The conduit 30" includes a pair of annular ribs 33", 35 to engage the bore 26 of the transmission case 23. One skilled in the art could provide such a seal 30" integrally molded as a unitary member, with the member 40" and lip seal 38" molded from a single material, such as a relatively rigid rubber member. Such a unitary member includes a plurality of slots 41 as described above to allow for oil flow and to facilitate axial compression thereof. The material and slots are designed to prevent excessive axial deflection of the lip 38" while permitting axial compression of the webs 43 to accommodate any variation in the transmission 20 and maintain the lip seal 38" in sealing engagement with the bore 26 and piston housing 22.

One skilled in the art recognizes that while the conduit 30 is illustrated in FIG. 2 as sealing against the outer surface to the piston housing 22, the conduit 30 could likewise seal against any annular or planar surface within the transmission in a like manner to provide a fluid passageway. Although not illustrated, one skilled in the art appreciates one example of this would comprise the clutch cylinder 27, provided the bore 26 in the case 23 were positioned in registration with a passageway (not shown) provided in the cylinder 27.

The use of the present seal could enable one to eliminate fluid tubes and the associated routing thereof which takes a large amount of space and expense within many current transmission designs. Likewise, the bore 26 may be provided in another member (versus the case 23), such as the valve body or manifold. In such an example, the conduit 30 may not sealingly engage the case 23, but communicates fluid from a source (such as the manifold) through the conduit 30 to the clutch.

The forms of the invention shown and described herein constitute preferred embodiments of the invention. They are not intended to illustrate all possible forms thereof. The words used are words of description rather than of limitation, and various changes may be made from that which is described herein without departing from the spirit and scope of the invention.

What is claimed is:

1. A conduit seal for an automotive transmission having an oil passageway provided therein in fluid communication with a clutch having a clutch member with an outer surface, the transmission including a member covering the passageway, a bore to communicate oil from the passageway to a second passageway provided in the clutch member, the conduit seal comprising:

an annular seal having an axial passageway therethrough, the annular seal adapted to be sealingly engaged with the bore and the outer surface of the clutch member to provide a fluid conduit therebetween;

resilient means adapted to be disposed between the annular seal and the member covering the passageway for axially urging the annular seal into sealing engagement with the outer surface of the clutch member; and wherein the resilient means comprises a helical spring and the annular seal comprises and annular cylinder having a first end engaged with the helical spring and a second end having an O-ring provided thereon for engagement with the clutch member.

2. A conduit seal for an automotive transmission having an oil passageway provided therein in fluid communication with a clutch having a clutch member with an outer surface, the transmission including a member covering the passageway, a bore to communicate oil from the passageway to a second passageway provided in the clutch member, the conduit seal comprising:

an annular seal having an axial passageway therethrough, the seal adapted to be sealingly engaged with the bore and the outer surface of the clutch member to provide a fluid conduit therebetween;

complaint means adapted to be disposed between the annular seal and the member covering the passageway for axially urging the annular seal into sealing engagement with the outer surface of the clutch member; and wherein the annular seal comprises a cylindrical substrate having a plurality of axially deformable webs at a first end thereof and a rubber lip seal provided at a second end thereof.

3. A seal as provided in claim 2, wherein the substrate comprises a plastic molded substrate having a plurality of apertures formed at the first end thereof, the webs extending therebetween, and the lip seal comprises an annular rubber lip seal at the second end of the substrate.

4. The seal as provided in claim 3, further comprising an annular seal provided adjacent the lip seal at the second end thereof for engagement with the bore.

5. The seal of claim 4, wherein the first end of the substrate is open.

6. The seal of claim 4, wherein the substrate and lip seal comprise a one-piece unitary molded member.

7. A transmission having a conduit seal comprising:

a transmission case having a radial bore provided therein, a clutch member having a wall adjacent the case, and a passageway formed in the member in registration with the bore of the case:

an oil passageway formed in the transmission case;

a cover provided over the passageway;

a conduit seal provided in the bore for communicating oil from the passageway through the bore and to the passageway in the member, the conduit seal comprising a lip seal sealingly abutting the outer surface of the member and sealingly engaged with the bore of the case; and resilient means provided between the seal and the cover for urging the seal against the member.

8. A seal according to claim 7, wherein the resilient means comprises a helical spring provided between the annular seal and the passageway cover.

9. A seal according to claim 8, wherein the annular seal comprises an annular substrate having a first end with an annular rubber seal molded thereon having an annular rib in engagement with the bore of the case and an annular lip seal in engagement with the member, the substrate having a second end inserted within the helical spring.

10. A seal according to claim 9 wherein the substrate comprises an annular steel cylinder having a stop formed thereon for engaging the end of the helical spring.

11. A seal according to claim 10, wherein the member comprises a clutch piston housing.

12. A seal according to claim 10, wherein the member comprises a clutch cylinder.

13. A seal according to claim 8, wherein the resilient means comprises a helical spring and the seal comprises an annular cylinder having a first end engaged with the helical spring and a second end having an O-ring provided thereon for engagement with the annular cylinder and the bore.

14. A method of transmitting fluid in a transmission through a conduit within a bore in the transmission to an annular clutch member, the method comprising:

providing a passageway in the annular clutch member in registration with the bore;

providing a conduit in the bore to communicate a fluid from the bore to the annular clutch member;

providing a seal at a first end of the conduit, the seal in sealing engagement with the bore and an outer surface of the annular clutch member; and providing a resilient member at the second end of the conduit for urging the seal into sealing engagement with the annular clutch member.

* * * * *